United States Patent
Ma (10) Patent No.: US 10,649,644 B2
(45) Date of Patent: May 12, 2020

(54) CONTROLLING MULTITASKING APPLICATION DISPLAYS USING GESTURES

(71) Applicants: Beijing Lenovo Software Ltd., Haidian District, Beijing (CN); Lenovo (Beijing) Co., Ltd., Haidian District, Beijing (CN)

(72) Inventor: Wei Ma, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 217 days.

(21) Appl. No.: 14/930,838

(22) Filed: Nov. 3, 2015

(65) Prior Publication Data

US 2017/0031555 A1   Feb. 2, 2017

(30) Foreign Application Priority Data

Jul. 27, 2015 (CN) .......................... 2015 1 0446141

(51) Int. Cl.
*G06F 3/0488* (2013.01)
*G06F 3/041* (2006.01)

(52) U.S. Cl.
CPC .......... *G06F 3/0488* (2013.01); *G06F 3/0416* (2013.01)

(58) Field of Classification Search
CPC ............................. G06F 3/0416; G06F 3/0488
See application file for complete search history.

(56) References Cited

U.S. PATENT DOCUMENTS

2002/0057263 A1* 5/2002 Keely ................. G06F 3/04883
                                                            345/179
2008/0034317 A1* 2/2008 Fard ..................... G06F 3/0481
                                                            715/781

(Continued)

FOREIGN PATENT DOCUMENTS

CN    102799381 A    11/2012
CN    103218109 A     7/2013
(Continued)

OTHER PUBLICATIONS

Office Action, and English language translation thereof, in corresponding Chinese Application No. 201510446141.0, dated Aug. 1, 2017, 11 pages.

*Primary Examiner* — Eric J. Bycer
(74) *Attorney, Agent, or Firm* — Brinks Gilson & Lione; John C. Freeman (57) ABSTRACT

A display processing method and a display processing device are described. The method includes receiving a first gesture operation on a touch display region of an electronic device, when a first application interface of a first application installed in the electronic device is displayed in the touch display region; determining whether the first gesture operation satisfies a first predetermined condition or not; generating a first sub interface to be displayed in a first sub region of the touch display region and a second sub interface to be displayed in a second sub region of the touch display region when it is determined that the first gesture operation satisfies the first predetermined condition; and displaying the first sub interface in the first sub region, and displaying the second sub interface in the second sub region.

10 Claims, 4 Drawing Sheets

(56) References Cited

U.S. PATENT DOCUMENTS

| | | | |
|---|---|---|---|
| 2009/0292989 A1* | 11/2009 | Matthews | G06F 3/0488 |
| | | | 715/702 |
| 2009/0313567 A1* | 12/2009 | Kwon | G06F 3/0482 |
| | | | 715/769 |
| 2010/0066698 A1* | 3/2010 | Seo | G06F 3/04883 |
| | | | 345/173 |
| 2010/0248788 A1* | 9/2010 | Yook | G06F 3/0481 |
| | | | 455/566 |
| 2011/0107272 A1* | 5/2011 | Aguilar | G06F 3/04815 |
| | | | 715/853 |
| 2011/0175930 A1* | 7/2011 | Hwang | G06F 3/0481 |
| | | | 345/629 |
| 2012/0176322 A1* | 7/2012 | Karmi | G06F 3/04883 |
| | | | 345/173 |
| 2013/0120294 A1* | 5/2013 | Sun | G06F 3/041 |
| | | | 345/173 |
| 2013/0311934 A1 | 11/2013 | Wu et al. | |
| 2014/0089832 A1* | 3/2014 | Kim | G06F 3/0481 |
| | | | 715/769 |
| 2014/0351748 A1 | 11/2014 | Xia et al. | |

FOREIGN PATENT DOCUMENTS

| CN | 103425422 A | 12/2013 |
|---|---|---|
| CN | 103677538 A | 3/2014 |
| CN | 104216600 A | 12/2014 |

\* cited by examiner

CONTROLLING MULTITASKING APPLICATION DISPLAYS USING GESTURES

This application claims priority to Chinese patent application No. 201510446141.0 filed Jul. 27, 2015, the entire contents of which are incorporated herein by reference.

The present disclosure relates to the display processing field, and particularly to a display processing method and a display processing device.

BACKGROUND

With the development of the touch control technology, an electronic device having a touch display such as a cell phone, a tablet, or the like, is increasingly popular. In such electronic device, normally, there are two ways for display, a single-window display and a multiple-window display. In the single-window display way, the touch screen is used to display an application interface of a single application. In the multiple-window display way, the touch screen is used to display multiple application interfaces of multiple applications. However, in the current multiple-window display way, the switch among the multiple windows is troublesome, and the user experience is poor.

SUMMARY

In view of the above, the present disclosure provides a display processing method and a display processing device, which enables a user to switch among multiple windows conveniently in a case of a multiple-window display, and improves the user experience greatly.

A display processing method is provided according to an embodiment of the present disclosure, comprising: receiving a first gesture operation on a touch display region of an electronic device, when a first application interface of a first application installed in the electronic device is displayed in the touch display region; determining whether the first gesture operation satisfies a first predetermined condition or not; generating a first sub interface to be displayed in a first sub region of the touch display region and a second sub interface to be displayed in a second sub region of the touch display region when it is determined that the first gesture operation satisfies the first predetermined condition, wherein the first sub interface corresponds to the first application interface, and the second sub interface corresponds to a second application interface of a second application installed in the electronic device; and displaying the first sub interface in the first sub region, and displaying the second sub interface in the second sub region.

DETAILED DESCRIPTION

Hereinafter, the embodiments of the present disclosure will be described in detail with reference to the accompany drawings.

First, the display processing method according to the embodiment of the present disclosure will be described.

The display processing method according to the embodiment of the present disclosure may be applied to an electronic device such as a cell phone, a tablet, or the like. The electronic device may be installed with various kinds of applications. Each application has its application interface. Further, the electronic device has a display for displaying content such as the application interface. The electronic device may further comprise a touch sensor to perform a touch control on the electronic device. The display and the touch sensor may be arranged in lamination to form a touch display. The region where the display and the touch sensor are arranged in lamination is the touch display region of the touch display.

Hereinafter, the display processing method according to the embodiment of the present disclosure will be described in detail with reference to FIGS. 1 and 2.

Figure 1:
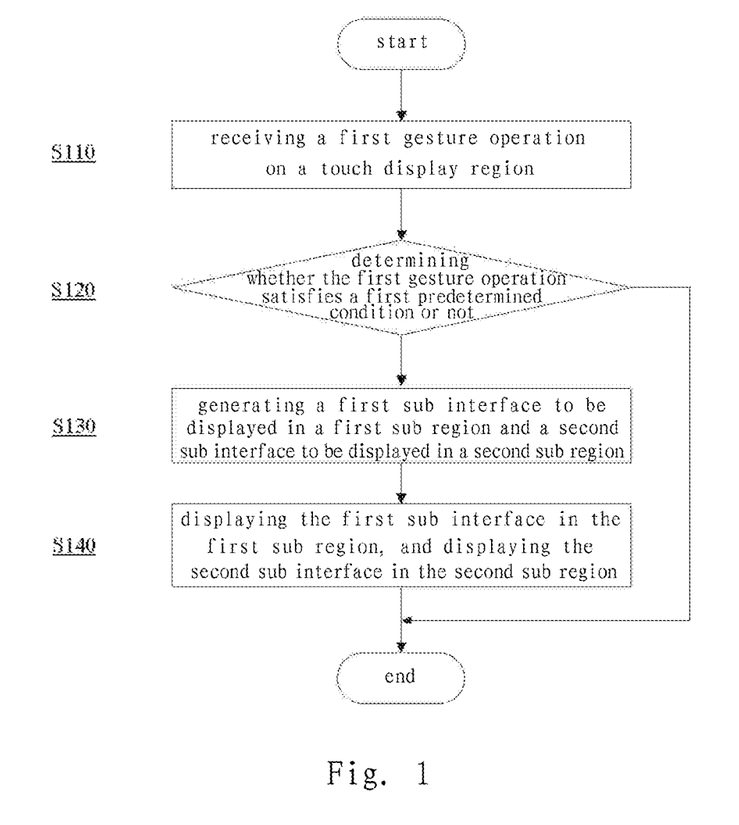
FIG. 1 is a flowchart showing a display processing method according to an embodiment of the present disclosure.
Figure 2:
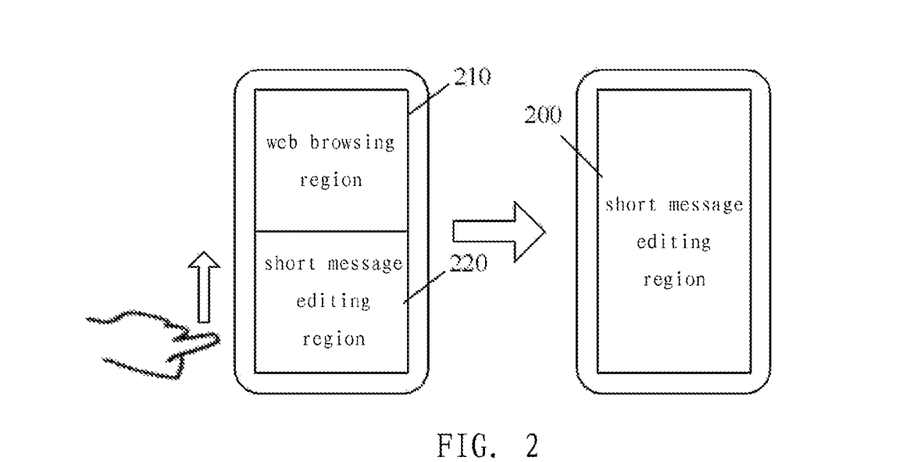
FIGS. 2A-2E are schematic diagrams showing a touch display region of an electronic device to which the display processing method according to the embodiment of the present disclosure is applied.

As shown in FIG. 1, first, at a step S110, a first gesture operation on a touch display region of an electronic device is received, when a first application interface of a first application installed in the electronic device is displayed in the touch display region.

Next, at a step S120, it is determined whether the first gesture operation satisfies a first predetermined condition or not.

For example, it may be determined whether the first gesture operation is a sliding operation. Optionally, it may be determined whether the first gesture operation is a sliding operation in a predetermined direction. Exemplarily, it may be determined whether the first gesture operation is an upward sliding operation.

When it is determined that the first gesture operation does not satisfy the first predetermined condition, the display processing method ends. For example, the display of the first application interface may be kept unchanged.

On the other hand, when it is determined that the first gesture operation satisfies the first predetermined condition, the display processing method goes to a step S130. At the step S130, a first sub interface to be displayed in a first sub region of the touch display region and a second sub interface to be displayed in a second sub region of the touch display region are generated. Thereby, at a step S140, the first sub interface is displayed in the first sub region, and the second sub interface is displayed in the second sub region.

Particularly, the first sub interface corresponds to the first application interface, and the second sub interface corresponds to a second application interface of a second application installed in the electronic device. The arrangement of the first application interface and the second application interface may be consistent with the first predetermined condition. For example, in a case in which the first predetermined condition is an upward sliding operation, the first sub interface and the second sub interface may be arranged to be an upper window and a lower window. More particularly, a transition effect for switching from a first application interface in the single-window display to the first sub interface and the second sub interface in the multiple-window display may be designed. For example, the transition effect may be such designed that with the upward sliding of the first gesture operation, the first application interface gradually zooms out in the upward direction, and at the same time the second application interface gradually emerges from the lower edge of the electronic device. Thereby, the multiple-window display is consistent with the user's operation habit and cognitive habit, so that it is convenient for the user to memory and grasp and the user experience is improved.

Figure 2A:
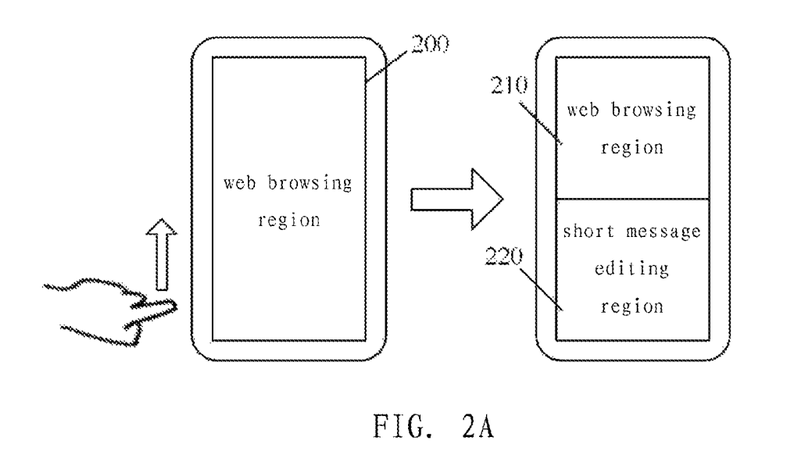

FIG. 2A shows a schematic diagram of the touch display region of the electronic device to which the display processing method according to the embodiment of the present disclosure is applied. As shown in the left part of FIG. 2A, the first application interface of the first application installed in the electronic device is displayed in the touch display region 200 of the electronic device. That is, the electronic device is in a single-window display mode. At this time, if the first gesture operation of sliding upwards as shown in the figure is received, the electronic device is switched to the multiple-window display mode, and the touch display screen is divided into an upper sub region 210 and a lower sub region 220 for displaying the first application interface and the second application interface, respectively.

Thereby, the user can switch from the single-window display mode to the multiple-window display mode by a simple operation consistent with the cognitive habit, the operation efficiency is improved and the user experience is improved.

It is to be noted that, in the above description, a case in which the first predetermined condition is the upward sliding operation is taken as an example. However, those skilled in the art may understand that the present disclosure is not limited thereto, and many other gesture operations may be designed as the predetermined condition. For example, in order to distinguish the operation for switching between the single-window display and the multiple-window display from the other ordinary operations, the display processing method may set the first predetermined condition as a continuous sliding operation without leaving the touch display screen after a long-time pressing operation.

Further, it is to be noted that, in the above description, a case in which the first sub interface and the second sub interface are arranged vertically is taken as an example. However, those skilled in the art may understand that the present disclosure is not limited thereto, and many other arrangements may be designed which all fall within the scope of the present disclosure.

Further, in another embodiment of the present disclosure, a second gesture operation on the touch display region may be received, after displaying the first sub interface in the first sub region and displaying the second sub interface in the second sub region at the step S140.

Next, similarly, it may be determined whether the second gesture operation satisfies a second predetermined condition or not. The second predetermined condition and the first predetermined condition may be the same or different. In the present example, the second predetermined condition is set to be the same as the first predetermined condition, i.e., an upward sliding operation.

A third sub interface to be displayed in a first sub region of the touch display region and a fourth sub interface to be displayed in a second sub region of the touch display region are generated, when it is determined that the second gesture operation satisfies the second predetermined condition, and then, the third sub interface is displayed in the first sub region, and the fourth sub interface is displayed in the second sub region.

Particularly, the third sub interface corresponds to the second application interface, and the fourth sub interface corresponds to a third application interface of a third application installed in the electronic device.

Figure 2B:
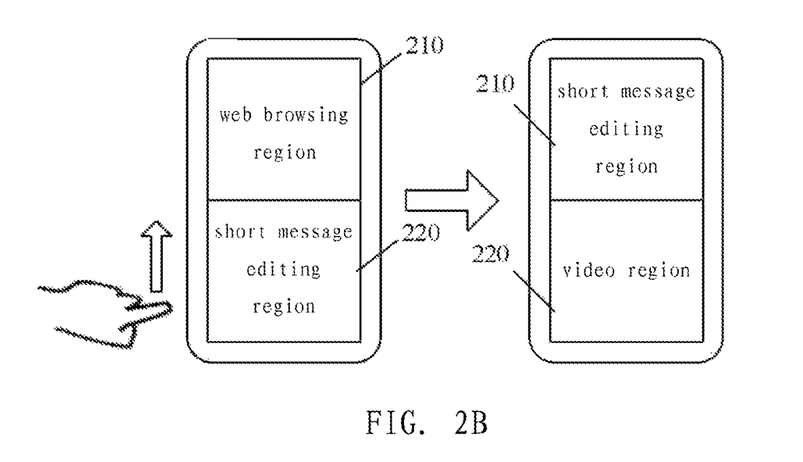

FIG. 2B shows a schematic diagram of the touch display region of the electronic device to which the display processing method according to the embodiment of the present disclosure is applied. As shown in the left part of FIG. 2B, the touch display screen of the electronic device is divided into an upper sub region 210 and a lower sub region 220 for displaying the first application interface of the first application and the second application interface of the second application, respectively. That is, the electronic device is in the multiple-window display mode. At this time, if the first gesture operation of sliding upwards as shown is received, the electronic device is switched among the multiple windows in the multiple-window display mode. Particularly, in the first sub region 210, the first application interface originally displayed is no longer displayed, instead, the second application interface originally displayed in the second sub region 220 is displayed. On the other hand, in the second sub region 220, the second application interface originally displayed is no longer displayed here since it is displayed in the first sub region 210, instead, a third application interface of a new third application is displayed. Similarly, various transition effects for switching among the windows may be designed. For example, the transition effect may be such designed that with the upward sliding of the first gesture operation, the first application interface gradually zooms out in the upward direction and finally disappears at the upper edge of the electronic device, the second application interface gradually moves upwards in a whole and is finally displayed in the first sub region, and the third application interface gradually emerges from the lower edge of the electronic device, and is finally displayed in the second sub region.

Thereby, the user can switch among the multiple windows in the multiple-window display mode by a simple operation consistent with the cognitive habit, the operation efficiency is improved and the user experience is improved.

Further, in another embodiment of the present disclosure, a third gesture operation on the touch display region may be received, after displaying the first sub interface in the first sub region and displaying the second sub interface in the second sub region at the step S140.

Next, similarly, it may be determined whether the third gesture operation satisfies a third predetermined condition or not. The third predetermined condition and the first predetermined condition are different. Optionally, the third predetermined condition is opposite to the first predetermined condition. For example, in the present example, the third predetermined condition is a downward sliding operation. Further, optionally, it may be determined whether an initial touch point of the third gesture operation on the touch display region is located in the first sub region. That is, the third predetermined condition may be set as a downward sliding operation with the initial touch point in the first sub region.

Only the first application interface is displayed in the touch display region when it is determined that the third gesture operation satisfies the third predetermined condition.

Figure 2C:
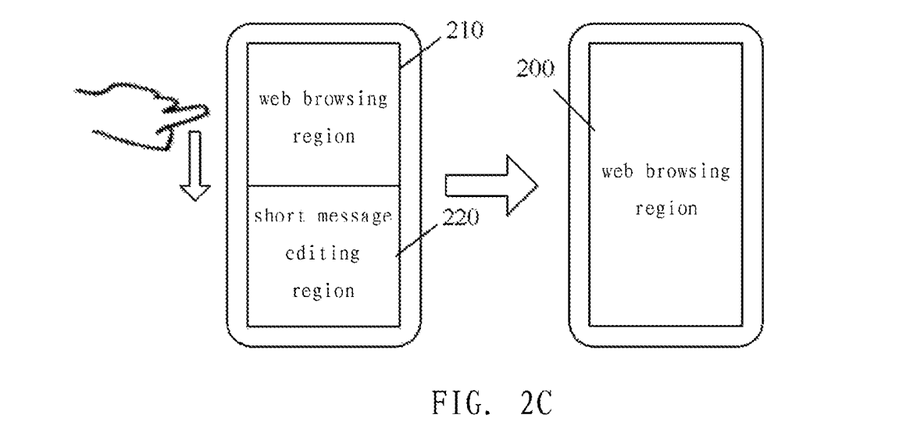

FIG. 2C shows a schematic diagram of the touch display region of the electronic device to which the display processing method according to the embodiment of the present disclosure is applied. As shown in the left part of FIG. 2C, the touch display screen of the electronic device is divided into an upper sub region 210 and a lower sub region 220 for displaying the first application interface of the first application and the second application interface of the second application, respectively. That is, the electronic device is in the multiple-window display mode. At this time, if the third gesture operation of sliding downwards with the original touch point in the first sub region as shown is received, the electronic device displays only the first application interface in the touch display region, as shown in FIG. 2C. That is, the electronic device is switched back to the single-window display mode. Similarly, various transition effects for switching among the windows may be designed. For example, the transition effect may be such designed that with the downward gesture operation, the second application interface gradually zooms out downwards and finally disappears at the lower edge of the electronic device, and the first application interface gradually zooms in downwards and is finally displayed in the whole touch display region.

Thereby, the user can switch back to the single-window display mode from the multiple-window display mode by a simple operation consistent with the cognitive habit, the operation efficiency is improved and the user experience is improved.

In a further embodiment, a fourth gesture operation on the touch display region may be received, after displaying the first sub interface in the first sub region and displaying the second sub interface in the second sub region in the step S140.

Next, similarly, it may be determined whether the fourth gesture operation satisfies a fourth predetermined condition or not. The fourth predetermined condition and the first predetermined condition may be similar to each other, for example, a sliding operation in the same direction. Further, it may be determined whether an initial touch point of the fourth gesture operation on the touch display region is located in the second sub region. That is, the fourth predetermined condition may be an upward sliding operation with the initial touch point in the second sub region.

Only the second application interface is displayed in the touch display region when it is determined that the fourth gesture operation satisfies the fourth predetermined condition.

FIG. 2D shows a schematic diagram of the touch display region of the electronic device to which the display processing method according to the embodiment of the present disclosure is applied. As shown in the left part of FIG. 2D, the touch display screen of the electronic device is divided into an upper sub region 210 and a lower sub region 220 for displaying the first application interface of the first application and the second application interface of the second application, respectively. That is, the electronic device is in the multiple-window display mode. At this time, if the fourth gesture operation of sliding upwards with the initial touch point in the second sub region as shown is received, the electronic device displays the second application interface only in the touch display region, as shown in the right part of FIG. 2D. That is, the electronic device is switched back to the single-window display mode. Further, in order to differ from the case as shown in FIG. 2B, in an example, it may be such designed that the electronic device only displays the second application interface in the touch display region if the fourth gesture operation with initial touch point in the second sub region, pressing for a while and then sliding upwards is received. Similarly, various transition effects for switching among the windows may be designed. For example, the transition effect may be such designed that with the upward sliding of the gesture operation, the first application interface gradually zooms out in the upward direction and finally disappears at the upper edge of the electronic device, the second application interface gradually zooms in upwards and is finally displayed in the whole touch display region.

Thereby, the user can switch back to the single-window display mode from the multiple-window display mode by a simple operation consistent with the cognitive habit, the operation efficiency is improved and the user experience is improved.

In a further embodiment, a fifth gesture operation on the touch display region may be received after displaying the first sub interface in the first sub region and displaying the second sub interface in the second sub region in the step S140.

Next, similarly, it may be determined whether the fifth gesture operation satisfies a fifth predetermined condition or not.

The fifth predetermined condition may be different from the first predetermined condition. Particularly, when the first predetermined condition is a sliding operation in a certain direction, the fifth predetermined condition may be a sliding operation in a direction vertically with the sliding direction of the first predetermined condition. In the present example, the fifth gesture operation is a sliding operation in a horizontal direction.

A fifth sub interface to be displayed in a second sub region of the touch display region is generated when it is determined that the fifth gesture operation satisfies the fifth predetermined condition, and then, the first sub interface is displayed in the first sub region, and the fifth sub interface is displayed in the second sub region. Particularly, the fifth sub interface corresponds to a third application interface of a third application installed in the electronic device.

Figure 2E:
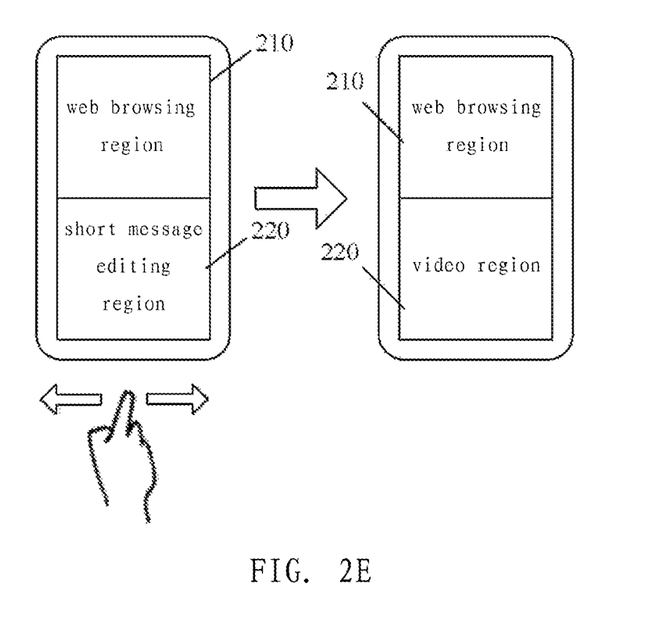

FIG. 2E shows a schematic diagram of the touch display region of the electronic device to which the display processing method according to the embodiment of the present disclosure is applied. As shown in the left part of FIG. 2E, the touch display screen of the electronic device is divided into an upper sub region 210 and a lower sub region 220 for displaying the first application interface of the first application and the second application interface of the second application, respectively. That is, the electronic device is in the multiple-window display mode. At this time, if the fifth gesture operation of sliding in the horizontal direction as shown is received, the electronic device is switched among the multiple windows in the multiple-window display mode, as shown in the right part of FIG. 2E. The first application interface is kept to be displayed in the first sub region 210. However, the second application interface displayed in the second sub region 220 is changed to the third application interface of the third application. Similarly, various transition effects for switching among the windows may be designed. For example, the transition effect may be such designed that with the leftward sliding of the gesture operation, the second application interface gradually moves leftwards and is finally disappears at the left edge of the electronic device, and the third application interface gradually emerges from the right edge of the electronic device, and is finally displayed in the second sub region.

Thereby, the user can switch among the multiple windows in the multiple-window display mode by a simple operation consistent with the cognitive habit, the operation efficiency is improved and the user experience is improved.

The display processing method according to the embodiment of the present disclosure has been described with reference to FIGS. 1 and 2. In the display processing method according to the embodiment of the present disclosure, the user can switch between the single-window display and the multiple-window display conveniently by a simple operation, and can switch among multiple windows in the case of the multiple-window display conveniently, the operation efficiency is increased and the user experience is improved greatly.

Hereinafter, the display processing device according to the embodiment of the present disclosure will be described with reference to FIG. 3.

The display processing device according to the embodiment of the present disclosure may be applied to an electronic device such as a cell phone, a tablet, or the like. The electronic device may be installed with various kinds of applications. Each application has its application interface. Further, the electronic device has a display for displaying content such as the application interface. The electronic device may further comprise a touch sensor to perform a touch control on the electronic device. The display and the touch sensor may be arranged in lamination to form a touch display. The region where the display and the touch sensor are arranged in lamination is the touch display region of the touch display.

Figure 3:
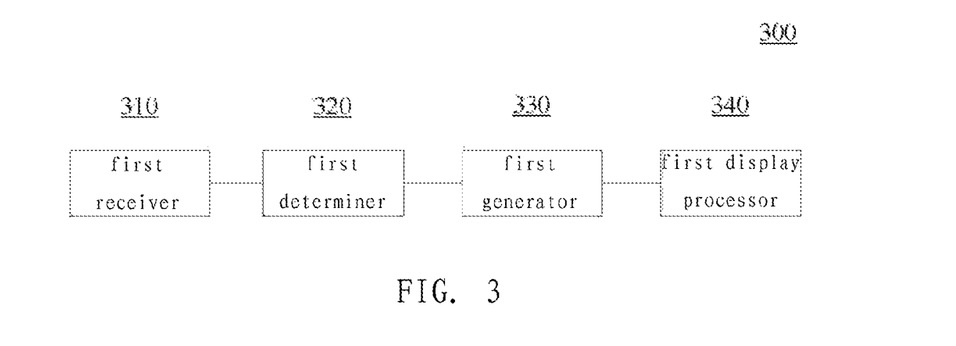
FIG. 3 is a block diagram showing a main configuration of a display processing device according to an embodiment of the present disclosure.

As shown in FIG. 3, the display processing device 300 according to the embodiment of the present disclosure comprises: a first receiver 310, a first determiner 320, a first generator 330 and a first display processor 340.

The first receiver 310 is operative to receive a first gesture operation on a touch display region of an electronic device, when a first application interface of a first application installed in the electronic device is displayed in the touch display region.

The first determiner 320 is operative to determine whether the first gesture operation satisfies a first predetermined condition or not.

The first generator 330 is operative to generate a first sub interface to be displayed in a first sub region of the touch display region and a second sub interface to be displayed in a second sub region of the touch display region when it is determined that the first gesture operation satisfies the first predetermined condition, wherein the first sub interface corresponds to the first application interface, and the second sub interface corresponds to a second application interface of a second application installed in the electronic device.

The first display processor 340 is operative to display the first sub interface in the first sub region, and to display the second sub interface in the second sub region.

In an embodiment, the display processing device 300 further comprises: a second receiver, operative to receive a second gesture operation on the touch display region, after displaying the first sub interface in the first sub region and displaying the second sub interface in the second sub region; a second determiner operative to determine whether the second gesture operation satisfies a second predetermined condition or not; a second generator operative to generate a third sub interface to be displayed in a first sub region of the touch display region and a fourth sub interface to be displayed in a second sub region of the touch display region when it is determined that the second gesture operation satisfies the second predetermined condition, wherein the third sub interface corresponds to the second application interface, and the fourth sub interface corresponds to a third application interface of a third application installed in the electronic device; and a second display processor operative to display the third sub interface in the first sub region, and to display the fourth sub interface in the second sub region.

In another embodiment, the display processing device further comprises: a third receiver operative to receive a third gesture operation on the touch display region, after displaying the first sub interface in the first sub region and displaying the second sub interface in the second sub region; a third determiner operative to determine whether the third gesture operation satisfies a third predetermined condition or not; a third display processor operative to display only the first application interface in the touch display region when it is determined that the third gesture operation satisfies the third predetermined condition.

In a further embodiment, the third determiner is operative to determine whether an initial touch point of the third gesture operation on the touch display region is located in the first sub region.

In a further embodiment, the display processing device further comprises: a fourth receiver operative to receive a fourth gesture operation on the touch display region, after displaying the first sub interface in the first sub region and displaying the second sub interface in the second sub region; a fourth determiner operative to determine whether the fourth gesture operation satisfies a fourth predetermined condition or not; and a fourth display processor operative to display only the second application interface in the touch display region when it is determined that the fourth gesture operation satisfies the fourth predetermined condition.

In a further embodiment, the fourth determiner is operative to determine whether an initial touch point of the fourth gesture operation on the touch display region is located in the second sub region.

In a further embodiment, the display processing device further comprises: a fifth receiver operative to receive a fifth gesture operation on the touch display region, after displaying the first sub interface in the first sub region and displaying the second sub interface in the second sub region; a fifth determiner operative to determine whether the fifth gesture operation satisfies a fifth predetermined condition or not; a fifth generator operative to generate a fifth sub interface to be displayed in a second sub region of the touch display region when it is determined that the fifth gesture operation satisfies the fifth predetermined condition, wherein the fifth sub interface corresponds to a third application interface of a third application installed in the electronic device; and a fifth display processor operative to display the first sub interface in the first sub region, and to display the fifth sub interface in the second sub region.

In a further embodiment, the first determiner is operative to determine whether the first gesture operation is a gesture operation in a first direction, and the fifth determiner is operative to determine whether the fifth gesture operation is a gesture operation in a second direction vertical with the first direction.

The display processing device according to the embodiment of the present disclosure has been described with reference to FIG. 3. In the display processing device according to the embodiment of the present disclosure, the user can switch between the single-window display and the multiple-window display conveniently by a simple operation, and can switch among multiple windows in the case of the multiple-window display conveniently, the operation efficiency is increased and the user experience is improved greatly.

According to another embodiment of the present disclosure, a display processing device is provided, comprising: a sensor operative to receive a first gesture operation on a touch display region of an electronic device, when a first application interface of a first application installed in the electronic device is displayed in the touch display region; a processor operative to determine whether the first gesture operation satisfies a first predetermined condition or not; to generate a first sub interface to be displayed in a first sub region of the touch display region and a second sub interface to be displayed in a second sub region of the touch display region when it is determined that the first gesture operation satisfies the first predetermined condition, wherein the first sub interface corresponds to the first application interface, and the second sub interface corresponds to a second application interface of a second application installed in the electronic device; and a display operative to display the first sub interface in the first sub region, and to display the second sub interface in the second sub region.

In an embodiment, the sensor is further operative to receive a second gesture operation on the touch display region, after displaying the first sub interface in the first sub region and displaying the second sub interface in the second sub region; the processor is further operative to determine whether the second gesture operation satisfies a second predetermined condition or not; to generate a third sub interface to be displayed in a first sub region of the touch display region and a fourth sub interface to be displayed in a second sub region of the touch display region when it is determined that the second gesture operation satisfies the second predetermined condition, wherein the third sub interface corresponds to the second application interface, and the fourth sub interface corresponds to a third application interface of a third application installed in the electronic device; and the display is further operative to display the third sub interface in the first sub region, and to display the fourth sub interface in the second sub region.

In a further embodiment, the sensor is further operative to receive a third gesture operation on the touch display region, after displaying the first sub interface in the first sub region and displaying the second sub interface in the second sub region; the processor is further operative to determine whether the third gesture operation satisfies a third predetermined condition or not; the display is further operative to display only the first application interface in the touch display region when it is determined that the third gesture operation satisfies the third predetermined condition.

In a further embodiment, the processor is further operative to determine whether an initial touch point of the third gesture operation on the touch display region is located in the first sub region.

In a further embodiment, the sensor is further operative to receive a fourth gesture operation on the touch display region, after displaying the first sub interface in the first sub region and displaying the second sub interface in the second sub region; the processor is further operative to determine whether the fourth gesture operation satisfies a fourth predetermined condition or not; and the display is further operative to display only the second application interface in the touch display region when it is determined that the fourth gesture operation satisfies the fourth predetermined condition.

In a further embodiment, the processor is further operative to determine whether an initial touch point of the fourth gesture operation on the touch display region is located in the second sub region.

In a further embodiment, the sensor is further operative to receive a fifth gesture operation on the touch display region, after displaying the first sub interface in the first sub region and displaying the second sub interface in the second sub region; the processor is further operative to determine whether the fifth gesture operation satisfies a fifth predetermined condition or not; to generate a fifth sub interface to be displayed in a second sub region of the touch display region when it is determined that the fifth gesture operation satisfies the fifth predetermined condition, wherein the fifth sub interface corresponds to a third application interface of a third application installed in the electronic device; and the display is further operative to display the first sub interface in the first sub region, and to display the fifth sub interface in the second sub region.

In a further embodiment, the processor is further operative to determine whether the first gesture operation is a gesture operation in a first direction, and to determine whether the fifth gesture operation is a gesture operation in a second direction vertical with the first direction.

It is to be noted that in the specification, the terms comprising, containing or any other variation are intended to be inclusive non-exhaustively, so that a process, a method, a product or a device comprising a series of elements not only include those elements, but may also include other elements not listed explicitly, or include elements inherent to the process, the method, the product or the device. Without any other limitation, an element limited by an expression "comprising a" does not exclude other same elements included in the process, the method, the product or the device comprising the element.

Further, it is to be noted that in the specification, the expressions similar to a first unit, a second unit are only for distinction, and do not mean that they must be realized as two or more units. In fact, the units may be realized as one single unit or multiple units as necessary.

Finally, it is to be noted that the above series process not only include the processes performed in a time order, but may also include processes in parallel or individually other than in the time order.

From the description of the embodiments, those skilled in the art may understand clearly that the present disclosure may be realized by software in combination with necessary hardware platform, and of course may all be implemented by hardware. Base on such understanding, the part of the technical solution of the invention which is contribute to the prior art may be embodied in the form of software product. This computer software product can be stored in a storage medium, such as a ROM/RAM, a disk, an optical disc and the like, include many instructions to cause one computer device (may be personal computer, server or network device etc.) to implement the embodiments of the invention or method describe by some parts of the embodiment.

In the embodiment of the present disclosure, the module may be realized by software so as to be executed by various processors. For example, an identified executable code module may comprise one or more physical or logical units of the computer instructions, which may, for example, be constructed as an object, a process or a function. Nevertheless, the executable codes of the identified module are not necessary to be located together physically, and may comprise different instructions stored at different locations, which may construct a module and achieve the predetermined purpose of the module when being combined together logically.

When the module is realized by software, considering the existing hardware manufacture process, those skilled in the art may realize its function by corresponding hardware circuits comprising the normal VLSI circuit or the existing semiconductor such as a logical chip or a transistor, or other separate elements, without the consideration of cost. The module may also be realized by a programmable hardware device, such as a field programmable gate array, a programmable array logic, or a programmable logical device, etc.

The above is only embodiments of the present disclosure. It should be noted that various modifications and alternations may be made by those of ordinary skill in the art without departing from the principle of the present disclosure, which should also be viewed as falling within the protection scope of the present disclosure.

The invention claimed is:

1. A display processing method comprising:
receiving a first gesture operation on a touch display region of an electronic device when a first application interface of a first application installed in the electronic device is displayed in the touch display region;
determining whether the first gesture operation satisfies a first predetermined condition or not, wherein the determining comprises determining whether the first gesture operation is an upward sliding operation that starts from a first position and ends at a second position defined to be positioned upward of the first position;
generating a first sub interface to be displayed in a first sub region of the touch display region and a second sub interface to be displayed in a second sub region of the touch display region when it is determined that the first gesture operation satisfies the first predetermined condition, wherein the first sub region is located upward relative to the second sub region, and wherein the first sub interface corresponds to the first application interface and the second sub interface corresponds to a second application interface of a second application installed in the electronic device, wherein both the first application interface and the second application interface are interfaces of activated applications;
displaying the first sub interface in the first sub region and displaying the second sub interface in the second sub region, wherein with the upward sliding operation of the first gesture operation, the first sub interface gradually zooms out in an upward direction, and at the same time the second sub interface gradually emerges in the upward direction from a lower edge of the electronic device, wherein the second sub region is located upward of the lower edge of the electronic device;
receiving a second gesture operation on the touch display region after displaying the first sub interface in the first sub region and displaying the second sub interface in the second sub region;
determining whether the second gesture operation satisfies a second predetermined condition or not;
generating a third sub interface to be displayed in the first sub region of the touch display region and a fourth sub interface to be displayed in the second sub region of the touch display region when it is determined that the second gesture operation satisfies the second predetermined condition, wherein the third sub interface corresponds to the second application interface and the fourth sub interface corresponds to a third application interface of a third application installed in the electronic device;
displaying the third sub interface in the first sub region and displaying the fourth sub interface in the second sub region;
wherein the display processing method further comprises:
receiving a fourth gesture operation on the touch display region after displaying the first sub interface in the first sub region and displaying the second sub interface in the second sub region;
determining whether the fourth gesture operation satisfies a fourth predetermined condition or not, wherein the determining whether the fourth gesture operation satisfies the fourth predetermined condition or not comprises determining whether an initial touch point of the fourth gesture operation on the touch display region is located in the second sub region; and
displaying only the second application interface in the touch display region when it is determined that the fourth gesture operation satisfies the fourth predetermined condition.

2. The display processing method of claim 1 further comprising:
receiving a third gesture operation on the touch display region after displaying the first sub interface in the first sub region and displaying the second sub interface in the second sub region;
determining whether the third gesture operation satisfies a third predetermined condition or not;
displaying only the first application interface in the touch display region when it is determined that the third gesture operation satisfies the third predetermined condition.

3. The display processing method of claim 2, wherein determining whether the third gesture operation satisfies the third predetermined condition or not comprises determining whether an initial touch point of the third gesture operation on the touch display region is located in the first sub region.

4. The display processing method of claim 1, further comprising:
receiving a fifth gesture operation on the touch display region after displaying the first sub interface in the first sub region and displaying the second sub interface in the second sub region;
determining whether the fifth gesture operation satisfies a fifth predetermined condition or not;
generating a fifth sub interface to be displayed in the second sub region of the touch display region when it is determined that the fifth gesture operation satisfies the fifth predetermined condition, wherein the fifth sub interface corresponds to a third application interface of a third application installed in the electronic device; and
displaying the first sub interface in the first sub region, and displaying the fifth sub interface in the second sub region.

5. The display processing method of claim 4, wherein determining whether the first gesture operation satisfies the first predetermined condition comprises determining whether the first gesture operation is a gesture operation in a first direction and determining whether the fifth gesture operation satisfies the fifth predetermined condition comprises determining whether the fifth gesture operation is a gesture operation in a second direction perpendicular to the first direction.

6. A display processing device comprising:
a sensor operative to receive a first gesture operation on a touch display region of an electronic device when a first application interface of a first application installed in the electronic device is displayed in the touch display region;
a processor operative to determine whether the first gesture operation satisfies a first predetermined condition or not by determining whether the first gesture operation is an upward sliding operation that starts from a first position and ends at a second position defined to be positioned upward of the first position, to generate a first sub interface to be displayed in a first sub region of the touch display region, and to generate a second sub interface to be displayed in a second sub region of the touch display region when it is determined that the first gesture operation satisfies the first predetermined condition, wherein the first sub region is located upward relative to the second sub region, and wherein the first sub interface corresponds to the first application interface and the second sub interface corresponds to a second application interface of a second application installed in the electronic device, wherein both the first application interface and the second application interface are interfaces of activated applications;

a display operative to display the first sub interface in the first sub region and to display the second sub interface in the second sub region, wherein with the upward sliding operation of the first gesture operation, the first sub interface gradually zooms out in an upward direction, and at the same time the second sub interface gradually emerges in the upward direction from a lower edge of the electronic device, wherein the second sub region is located upward of the lower edge of the electronic device; wherein the sensor is further operative to receive a second gesture operation on the touch display region after displaying the first sub interface in the first sub region and displaying the second sub interface in the second sub region;

the processor is further operative to determine whether the second gesture operation satisfies a second predetermined condition or not, to generate a third sub interface to be displayed in the first sub region of the touch display region, and to generate a fourth sub interface to be displayed in the second sub region of the touch display region when it is determined that the second gesture operation satisfies the second predetermined condition, wherein the third sub interface corresponds to the second application interface and the fourth sub interface corresponds to a third application interface of a third application installed in the electronic device;

the display is further operative to display the third sub interface in the first sub region and to display the fourth sub interface in the second sub region;

the sensor is further operative to receive a fourth gesture operation on the touch display region after displaying the first sub interface in the first sub region and displaying the second sub interface in the second sub region;

the processor is further operative to determine whether the fourth gesture operation satisfies a fourth predetermined condition or not which comprises determining whether an initial touch point of the fourth gesture operation on the touch display region is located in the second sub region; and the display is further operative to display only the second application interface in the touch display region when it is determined that the fourth gesture operation satisfies the fourth predetermined condition.

7. The display processing device of claim 6, wherein:

the sensor is further operative to receive a third gesture operation on the touch display region after displaying the first sub interface in the first sub region and displaying the second sub interface in the second sub region;

the processor is further operative to determine whether the third gesture operation satisfies a third predetermined condition or not;

the display is further operative to display only the first application interface in the touch display region when it is determined that the third gesture operation satisfies the third predetermined condition.

8. The display processing device of claim 7, wherein the processor is further operative to determine whether an initial touch point of the third gesture operation on the touch display region is located in the first sub region.

9. The display processing device of claim 6, wherein:

the sensor is further operative to receive a fifth gesture operation on the touch display region after displaying the first sub interface in the first sub region and displaying the second sub interface in the second sub region;

the processor is further operative to determine whether the fifth gesture operation satisfies a fifth predetermined condition or not; to generate a fifth sub interface to be displayed in the second sub region of the touch display region when it is determined that the fifth gesture operation satisfies the fifth predetermined condition, wherein the fifth sub interface corresponds to a third application interface of a third application installed in the electronic device; and the display is further operative to display the first sub interface in the first sub region, and to display the fifth sub interface in the second sub region.

10. The display processing device of claim 9, wherein the processor is further operative to determine whether the first gesture operation is a gesture operation in a first direction, and to determine whether the fifth gesture operation is a gesture operation in a second direction perpendicular to the first direction.

* * * * *